United States Patent [19]

Murakami

[11] Patent Number: 5,065,831
[45] Date of Patent: Nov. 19, 1991

[54] MOUNTING ARRANGEMENT FOR FINAL DRIVE UNIT FOR AUTOMOTIVE VEHICLES

[75] Inventor: Shinichi Murakami, Kanagawa, Japan

[73] Assignee: Nissan Motor Co., Ltd., Yokohama, Japan

[21] Appl. No.: 527,475

[22] Filed: May 23, 1990

[30] Foreign Application Priority Data

May 23, 1989 [JP] Japan .................. 1-129891

[51] Int. Cl.⁵ .................. B60K 5/02; B60K 17/04; B60K 17/34
[52] U.S. Cl. .................. 180/55; 180/292; 180/69.1; 475/198
[58] Field of Search ............ 180/233, 248, 249, 250, 180/254, 256, 291, 292, 297, 300, 69.1, 55, 375, 376, 247; 475/198, 200, 201; 123/198 E

[56] References Cited

U.S. PATENT DOCUMENTS

| | | | |
|---|---|---|---|
| 3,052,313 | 9/1962 | Hooven | 180/292 X |
| 3,213,958 | 10/1965 | Muller | 180/292 X |
| 3,399,743 | 9/1968 | Hetmann | 180/292 X |
| 3,420,327 | 1/1969 | Nallinger et al. | 180/256 X |
| 3,428,140 | 2/1969 | Tolan, Jr. | 180/256 |
| 3,489,237 | 1/1970 | van Winsen et al. | 180/254 X |
| 3,494,225 | 2/1970 | Binder et al. | 475/198 |
| 3,580,350 | 5/1971 | Arkus-Duntov | 180/292 X |
| 4,205,729 | 6/1980 | Morino | 180/55 |
| 4,300,649 | 11/1981 | Sakata | 180/291 X |
| 4,530,415 | 7/1985 | Sakata et al. | 180/256 X |
| 4,650,030 | 3/1987 | Moriyama et al. | 180/292 |

FOREIGN PATENT DOCUMENTS

| | | | |
|---|---|---|---|
| 0183051 | 6/1986 | European Pat. Off. | |
| 0213960 | 3/1987 | European Pat. Off. | |
| 0138235 | 10/1979 | Japan | 180/297 |
| 0144626 | 11/1979 | Japan | 180/297 |
| 0000423 | 1/1983 | Japan | 180/297 |

Primary Examiner—Andres Kashnikow
Assistant Examiner—Brian L. Johnson
Attorney, Agent, or Firm—Pennie & Edmonds

[57] ABSTRACT

An enclosure for receiving therein a differential case of an automotive vehicle is arranged adjacent an internal combustion engine and is connected to an oil pan arranged beneath the engine. The enclosure is inclined at a predetermined angle about the horizontal axis of the engine. The enclosure has a pair of openings in the side wall thereof through which a pair of axle shafts pass. The axle shafts are also inclined at the same angle as the inclined angle of the enclosure. One of the axle shafts passes through openings formed in the side walls of the oil pan so as to extend to the opposite side of the oil pan. The inclinations of the enclosure and axle shafts allows the height of an engine hood and the width of the vehicular body to be decreased.

7 Claims, 2 Drawing Sheets

MOUNTING ARRANGEMENT FOR FINAL DRIVE UNIT FOR AUTOMOTIVE VEHICLES

BACKGROUND OF THE INVENTION

1. Field of the Invention

The present invention relates generally to a mounting arrangement for a final drive unit including a differential and a pair of axle shafts for automotive vehicles. More specifically, the invention relates to an improved mounting arrangement of a final drive unit for automotive vehicles in which an enclosure for receiving a differential case is arranged adjacent a longitudinally-mounted type engine.

2. Description of the Background Art

Conventionally, in the case of four-wheel drive vehicles on which an internal combustion engine is longitudinally mounted at the front of the vehicular body, a transmission is connected to the rear portion of the engine, and an enclosure for receiving a differential case is arranged beneath an oil pan of the engine. The transmission is connected to a final drive unit including the differential case and a pair of axle shafts via a propeller shaft and joints. The axle shafts extend horizontally to pass through openings formed in the side walls of the enclosure of the final drive unit to project therefrom. The ends of the projected portions of the axle shafts are connected to front-right and front-left wheels via joints, respectively.

In such a mounting arrangement or structure, the total height of the engine becomes relatively high so that the position of an engine hood becomes relatively high since the final drive unit is arranged beneath the oil pan of the engine. Therefore, such a mounting arrangement can not be applied to a low profile automotive vehicle.

In order to overcome such a disadvantage, Japanese Patent First (unexamined) Publication (Tokkai Sho.) 61-105217 discloses an improved mounting arrangement in which an enclosure for receiving a differential case is arranged adjacent an engine. In this arrangement, the enclosure is connected to the side wall of an oil pan, and a pair of axle shafts extend horizontally to pass through openings formed in the side walls of the oil pan.

However, there is a disadvantage in that such a mounting arrangement can not be applied to automotive vehicles other than vehicles which are wide enough to mount a lower link of a suspension system at a location adjacent the enclosure of the final drive unit, since the enclosure of the final drive unit occupies a relatively large space at a location adjacent the engine. If such a mounting arrangement is applied to a vehicle having a narrow width, the length of the lower link must be shortened, which degrades driving stability.

SUMMARY OF THE INVENTION

It is therefore a principal object of the present invention to provide a mounting arrangement for a final drive unit which can be applied to an automotive vehicle, of which the heights of the engine and engine hood are relatively low, and which can allow a lower link of a suspension system to be mounted on a vehicular body without increasing the width thereof.

In order to accomplish the aforementioned and other objects, a mounting arrangement for an automotive vehicle, according to the present invention, includes a differential case receiving enclosure arranged adjacent an internal combustion engine and connected to an oil pan of the engine so as to tilt the enclosure about a horizontal axis of the engine at a predetermined angle, and a pair of axle shafts arranged to be inclined at the same angle as the enclosure, which pass through openings formed in the side walls of the oil pan.

According to one aspect of the present invention, a mounting arrangement for an automotive vehicle, comprises:

an internal combustion engine;

an oil pan arranged beneath the engine to be connected to the latter, and having a pair of openings in the side walls thereof;

an enclosure for receiving therein and rotatably supporting a differential case, the enclosure being arranged adjacent the engine and connected to the side wall of the oil pan so as to be inclined at a predetermined angle about a horizontal axis of the engine; the enclosure having a pair of openings facing each other in the side walls thereof; and a pair of axle shafts, one of which passes through one of the openings of the enclosure, and the other of which passes through the other opening of the enclosure and the openings of the oil pan, the axle shafts having axes inclined at the same angle as the inclined angle of the enclosure.

According to another aspect of the invention, a mounting arrangement for an automotive vehicle, comprises:

an internal combustion engine;

an oil pan arranged beneath the engine to be connected to the latter, and having a pair of openings in the side walls thereof;

an enclosure for receiving therein and rotatably supporting a differential case, the enclosure being arranged adjacent the engine and connected to the side wall of the oil pan, the enclosure being inclined at a predetermined angle about a horizontal axis of the engine, the enclosure having a pair of openings facing each other in the side walls thereof; and a pair of axle shafts, one of which passes through one of the openings of the enclosure, and the other of which passes through the other opening of the enclosure and the openings of the oil pan, the axle shafts having axes inclined at the same angle as the inclined angle of the enclosure so that the axes of the axle shafts are substantially coincident with the rotation axis of the differential case.

According to another aspect of the invention, a mounting arrangement for an automotive vehicle, comprises:

an internal combustion engine;

an oil pan arranged beneath the engine;

an enclosure for receiving a differential case, the enclosure being arranged adjacent the engine and connected to the side wall of the oil pan so as to be inclined at a predetermined angle about an horizontal axis of the engine; and a pair of axle shafts arranged to be inclined at the same angle as the inclined angle of the enclosure so as to pass through openings formed in the side walls of the enclosure and the oil pan.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention but are for explanation and understanding only.

In the drawings.

DESCRIPTION OF THE PREFERRED EMBODIMENT

Figure 1:
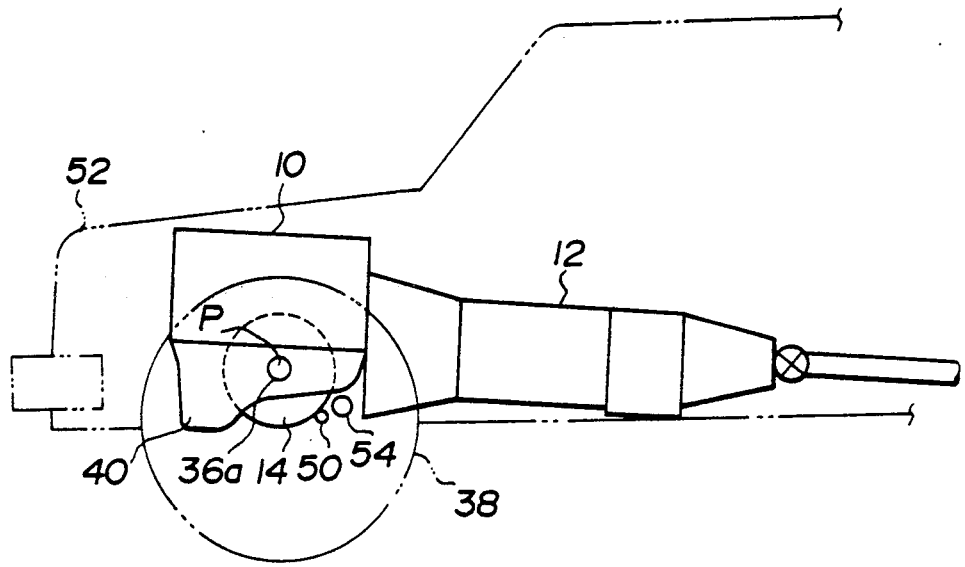
FIG. 1 is a schematic side view showing a mounting arrangement for a final drive unit, according to the present invention.

Referring now to the drawings, particularly to FIG. 1, there is shown a mounting arrangement for an engine 10, a transmission 12 and a final drive unit 14. The mounting arrangement of invention can be particularly applied to automotive vehicles, in which the engine is longitudinaly mounted at the front of the vehicle body, such as a four-wheel drive vehicle.

Figure 2:
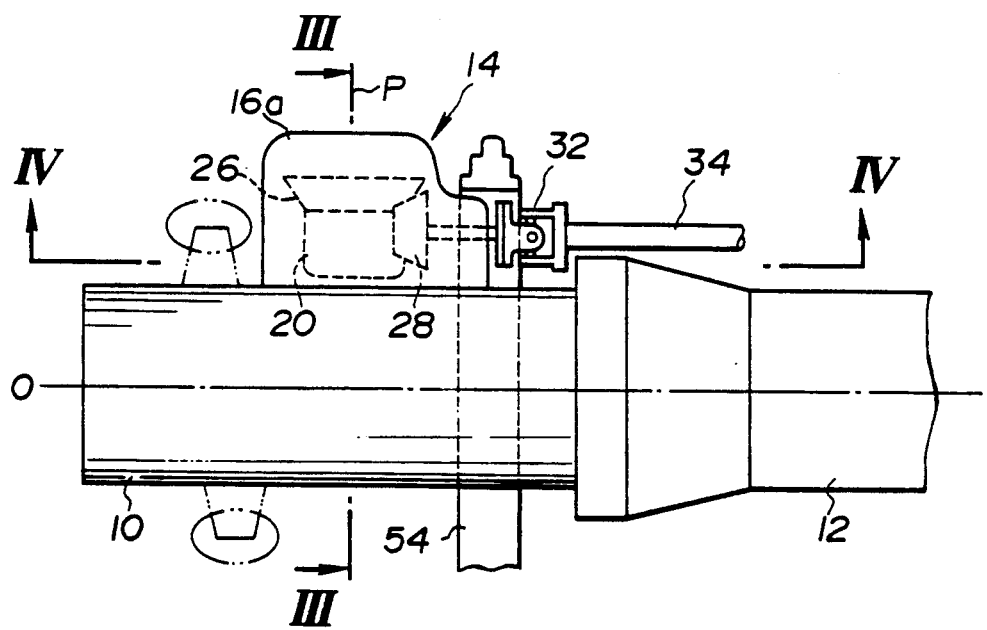
FIG. 2 is a top view of the mounting arrangement of FIG. 1.

As can be seen clearly from FIG. 2, the transmission 12 is arranged at a location behind the engine 10, and the final drive unit 14 is arranged adjacent the engine 10.

Figure 3:
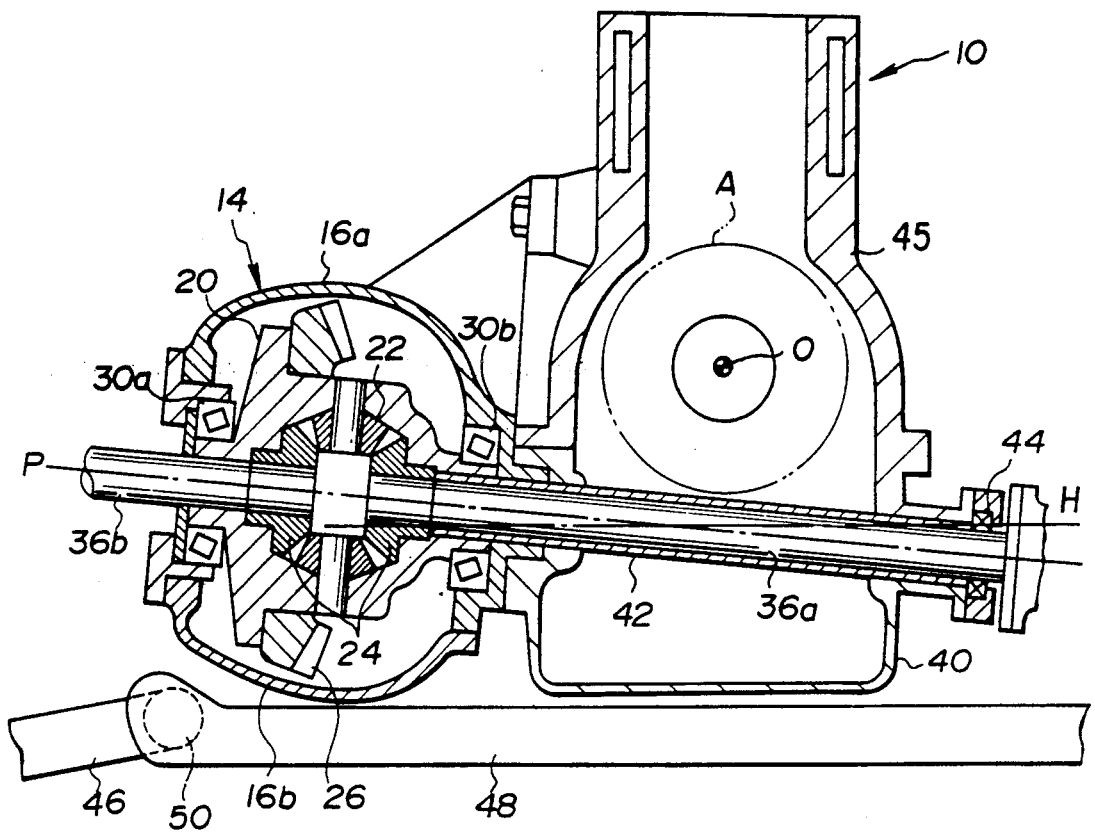
FIG. 3 is a sectional view of the mounting arrangement taken along the line III—III of FIG. 2.
Figure 4:
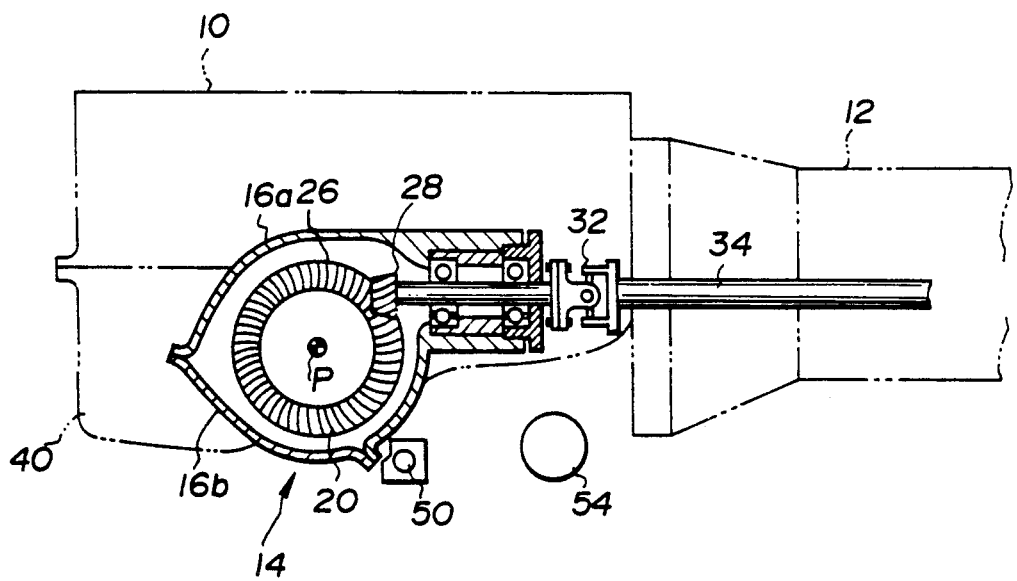
FIG. 4 is a sectional view of the mounting arrangement taken along the line IV—IV of FIG. 2.

Now referring to FIGS. 3 and 4, the final drive unit 14 comprises an enclosure comprised of upper and lower halves 16a and 16b respectively, a differential case 20, a differential pinion gear 22, a differential side-gear 24, a ring-gear 26 and a final drive pinion 28, similarly to conventional arrangements. The upper enclosure 16a engages the lower enclosure 16b so as to define a space therein. The differential case 20 is housed within the space defined by the upper enclosure 16a and the lower enclosure 16b and rotatably supported therein via bearings 30a and 30b. As is well known, the differential pinion gear 22 and the differential side-gear 24 are housed within the differential case 20. The ring-gear 26 is fixed to the differential case 20 and engages the final drive pinion 28. The final drive pinion 28 is connected to the transmission 12 via a joint 32 and a propeller shaft 34. A pair of axle shafts 36a and 36b are supported on the differential case 20 via the differential pinion gear 22 and the differential side-gear 24, so that the rotation force of the propeller shaft 34 is transmitted to the axle shafts 36a and 36b via the differential case 20. The axle shafts 36a and 36b pass through openings formed in both side walls of the upper enclosure 16a to project therefrom, respectively. The end portions of the axle shaft 36a and 36b are connected to wheels 38 via joints (not shown).

According to the present invention, an oil pan 40 of the engine 10 is arranged adjacent the enclosure 16a, 16b and is integrally formed with the engine. In addition, the enclosure 16a, 16b is inclined at a predetermined angle about an horizontal axis H of the engine 10, as best illustrated in FIG. 3.

An essentially cylindrical pipe 42 passes through openings formed in both side walls of the oil pan 40 of the engine 10 to be secured to the oil pan 40. The pipe 42 extends so as to be inclined downwards at the same angle as the enclosure 16a, 16b from a first end neighboring the final drive unit 14 to the other end thereof. One axle shaft 36a passes through the pipe 42, and the end portion of the axle shaft 36a projected from the oil pan is supported on the oil pan 40 via a bearing 44. Therefore, the axle shaft 36a passes through the oil pan 40 to extend at the same angle as the inclined angle of the enclosure 16a, 16b. The pipe 42 is preferably arranged at its highest position under conditions such that the pipe 42 does not affect the outermost locus A (in FIG. 3) of the crankshaft, connecting rod and so forth of the engine 10, so that the pipe 42 approaches as near as possible toward the central point O (in FIG. 3) of the engine 10. The inclined angles of the upper enclosure 16a and the axle shaft 36a are limited such that the height of the end portion supported on the oil pan 40 via the bearing 44 does not become lower than the height of the bottom of the lower enclosure 16b, and such that a space in which the bearing 30b is arranged in the enclosure 16a, 16b does not affect the cylinder block 45 of the engine 10.

In addition, a lower link 46 of a suspension system is supported on a vehicular frame 48 so as to be pivotable around an axis 50. As shown in FIG. 1, the pivotal axis 50 of the lower link 46 is arranged at a location behind and below the rotation axis P of the ring-gear 26 and below the enclosure 16a, 16b of the final drive unit 14. Since the enclosure 16a, 16b is inclined about the horizontal axis H of the engine 10, the engine 10 can be arranged at a lower position than that of conventional mounting arrangements in which the enclosure of the final drive unit is arranged horizontally. In addition, the pivotal axis 50 of the lower link 46 can be so arranged as to be closer to the central point O of the engine 10 than in conventional mounting arrangements in which the enclosure of the final drive unit is arranged horizontally. Therefore, according to the present invention, it is possible to provide a sufficient length of the lower link 46 without increasing the width of the vehicle body.

In addition, it is possible to decrease the angles between the axle shafts 36a and 36b and joints (not shown) arranged on the ends of the lower links 46 of the suspension system. As a result, the height of an engine hood 52 and the width of the vehicular body can not be only decreased, but it is also possible to decrease the camber angle and so forth so as to improve driving stability.

In the shown embodiment, though the pivotal axis 50 of the lower link 46 is arranged behind and below the pivotal axis P of the ring-gear 26, it can alternatively be arranged before the latter. In this case, it is also possible to obtain similar effect. In addition, if the pivotal axis 50 of the lower link 46 is not offset from the pivotal axis P of the ring-gear 26 in a longitudinal direction, it is possible to provide a longer lower link 46 than in conventional mounting arrangements.

Furthermore, the position of the axle of the final drive pinion 28 is higher than that of the pivotal axis P of the ring-gear 26. A steering rack or relay rod 54 is arranged at a location below the axle of the final drive pinion 28 and before the transmission 12. The joint 32 which transmits the rotation force of the propeller shaft 34 to the final drive unit 14 is arranged at a location before the transmission 12.

While the shown mounting arrangement is applied to a four-wheel drive vehicle in the embodiment, it can be applied to other front wheel drive types of vehicles.

What is claimed is:

1. A power drive arrangement for an automotive vehicle having a longitudinally mounted engine and an oil pan mounted or integral with the engine, said arrangement comprising:

a pair of axle shafts;

a sleeve for receiving therein one of said pair of axle shafts, said sleeve extending through said oil pan substantially perpendicular to the longitudinal direction of the engine and being inclined at a predetermined angle relative to a horizontal axis of the engine;

means formed in said oil pan for permitting said sleeve to pass therethrough and for permitting said sleeve to be inclined about the horizontal axis; and an enclosure for receiving therein and rotatably supporting a differential unit, said enclosure being adjacent the engine and fixedly connected to the oil pan, said differential unit engaging an end portion of each of said axle shafts, said differential unit and said enclosure being coaxially positioned about said axle shafts whereby said differential unit and said enclosure is inclined at the same angle as said sleeve.

2. A power drive arrangement according to claim 1, wherein longitudinal axes of said axle shafts coincide with a rotation axis of said differential case.

3. A power drive arrangement according to claim 1, wherein said engine is front mounted and said axle shafts drive front wheels of a vehicle.

4. A power drive arrangement according to claim 2, wherein said axle shafts drive said front wheels of a four-wheel drive vehicle.

5. A power drive arrangement according to claim 1, wherein said differential unit includes a ring-gear and a final drive pinion gear, said final drive pinion gear being situated between the ring-gear and an engine block.

6. A power drive arrangement according to claim 1, wherein said enclosure has a recessed portion for receiving an end portion of a steering rack, so as to prevent the end portion of the steering rack from protruding from a surface of said enclosure which is farthest from an engine block and on a plane perpendicular to the axis of the sleeve.

7. A power drive arrangement for an automotive vehicle having a longitudinally mounted engine and an oil pan mounted or integral with the engine, said arrangement comprising:

a pair of axle shafts;

a sleeve for receiving therein one of said pair of axle shafts, said sleeve extending through said oil pan in a direction substantially perpendicular to the longitudinal direction of the engine and being inclined at a predetermined angle relative to a horizontal axis of the engine;

means formed in said oil pan for permitting said sleeve to pass through therethrough and for permitting said sleeve to be inclined about the horizontal axis, and for rotatably supporting said sleeve; and an enclosure for receiving therein and rotatably supporting a differential unit which receives power input, said enclosure being adjacent the engine and fixedly connected to said oil pan, said differential unit engaging an end portion of each of said axle shafts whereby said differential unit drives said axle shafts, said differential unit and said enclosure being coaxially positioned about said axle shafts whereby said differential unit and said enclosure is inclined at the same angle as said sleeve.

* * * * *